United States Patent
Yamashita (10) Patent No.: US 8,790,061 B2
(45) Date of Patent: Jul. 29, 2014

(54) TRANSFERRING SHUTTLE FOR THREE DIMENSIONAL AUTOMATED WAREHOUSE

(75) Inventor: Shin Yamashita, Obertshausen (DE)

(73) Assignee: Dematic Accounting Services GmbH, Offenbach (DE)

( * ) Notice: Subject to any disclaimer, the term of this patent is extended or adjusted under 35 U.S.C. 154(b) by 310 days.

(21) Appl. No.: 12/446,534

(22) PCT Filed: Oct. 27, 2008

(86) PCT No.: PCT/JP2008/069464
§ 371 (c)(1),
(2), (4) Date: Sep. 3, 2010

(87) PCT Pub. No.: WO2010/049987
PCT Pub. Date: May 6, 2010

(65) Prior Publication Data
US 2011/0008138 A1      Jan. 13, 2011

(51) Int. Cl.
*B65G 1/04* (2006.01)
(52) U.S. Cl.
USPC .......................................... 414/280; 414/281
(58) Field of Classification Search
USPC ................... 414/278–280, 807, 281
See application file for complete search history.

(56) References Cited

U.S. PATENT DOCUMENTS

| | | | | |
|---|---|---|---|---|
| 3,817,406 A | * | 6/1974 | Sawada et al. | 414/279 |
| 5,033,928 A | * | 7/1991 | Suominen | 414/277 |
| 5,839,873 A | * | 11/1998 | Lloyd et al. | 414/280 |
| 6,149,366 A | * | 11/2000 | Deandrea | 414/279 |
| 6,619,902 B1 | * | 9/2003 | Castaldi et al. | 414/280 |
| 6,923,612 B2 | | 8/2005 | Hansl | |
| 7,128,521 B2 | * | 10/2006 | Hansl | 414/807 |
| 7,686,560 B2 | * | 3/2010 | Laurin et al. | 414/278 |
| 7,771,152 B2 | * | 8/2010 | Waltersbacher | 414/280 |
| 2003/0185656 A1 | | 10/2003 | Hansl | |
| 2006/0245862 A1 | * | 11/2006 | Hansl et al. | 414/281 |
| 2007/0003396 A1 | * | 1/2007 | Berdelle-Hilge | 414/280 |
| 2011/0008137 A1 | | 1/2011 | Yamashita | |

FOREIGN PATENT DOCUMENTS

| | | |
|---|---|---|
| DE | 202004004620 U1 | 8/2004 |
| EP | 0733563 A1 | 9/1996 |
| EP | 1772400 A1 | 4/2007 |
| EP | 2030938 A1 | 3/2009 |
| EP | 1631521 B1 | 10/2010 |
| EP | 2272787 A1 | 1/2011 |

(Continued)

OTHER PUBLICATIONS

Sclater, N., Mechanisms and Mechanical Devices Sourcebook, 4th Edition (2007), p. 25.*

(Continued)

*Primary Examiner* — Jonathan Snelting
(74) *Attorney, Agent, or Firm* — Gardner, Linn, Burkhart & Flory, LLP (57) ABSTRACT

A transferring shuttle, which transfers package(s) between a pair of layered stacked racks in a three dimensional automated warehouse, includes a mobile platform which runs between the stacked racks; elastic mechanisms, which include telescoping rails that extend into the stacked racks and surround a package; and terminal fingers placed at the ends of the rails, which can move between an extended position, which allows the package to be engaged and a contracted position. The rails also contain inner fingers between the terminal fingers. The inner fingers can push the package further into the stacked rack than previously possible.

8 Claims, 7 Drawing Sheets

(56) References Cited

FOREIGN PATENT DOCUMENTS

| | | |
|---|---|---|
| JP | 08-175620 | 7/1996 |
| JP | 08-175621 | 7/1996 |
| JP | 08324721 | 12/1996 |
| JP | 09-240809 | 9/1997 |
| JP | 63-165205 | 7/1998 |
| JP | 10-297712 | 11/1998 |
| JP | 11079321 | 3/1999 |
| JP | 2000211706 A | 8/2000 |
| JP | 2003-048604 A | 2/2003 |
| JP | 2004-123240 | 4/2004 |
| JP | 2006-096522 A | 4/2006 |
| WO | WO03019425 | 3/2003 |

OTHER PUBLICATIONS

English Translation of the International Preliminary Report on Patentability from corresponding Patent Cooperation Treaty Patent Application No. PCT/JP2008/069464 dated Jun. 7, 2011.
Commonly assigned co-pending U.S. Appl. No. 13/246,160, filed Sep. 27, 2011, for a Shuttle for Automated Warehouse.
English Abstract of WO03019425.
The International Search Report from corresponding PCT Application No. PCT/JP2008/069464.
European Search Report from corresponding European Patent Application No. 08877699 dated Dec. 11, 2012.

* cited by examiner

TRANSFERRING SHUTTLE FOR THREE DIMENSIONAL AUTOMATED WAREHOUSE

CROSS-REFERENCE TO RELATED APPLICATIONS

This patent is a national stage filing under 35 U.S.C. §371 of international application Ser. No. PCT/JP2008/069464 filed in the Japanese Receiving Office on Oct. 27, 2008, the complete disclosure of which is hereby incorporated herein by reference.

BACKGROUND OF THE INVENTION

1. Technical Area

This patent relates to a three-dimensional automated warehouse with at least one pair of layered stacked racks, and more particularly to transferring shuttles which are placed on every layer, or on every few layers, of the stack of racks, and which run in a horizontal direction and transfers package(s) to and from the layered stacked racks.

2. Technical Background

A known example of a three dimensional warehouse is described in Japanese Patent Disclosure Heisei 8-324721. The three dimensional warehouse described in this Patent Disclosure is comprised of at least one pair of left and right layered stacks of racks, each containing multiple layers. A transferring shuttle, which can run in a horizontal direction, is implemented for each layer of the stacked racks.

The purpose of the transferring shuttle is to transfer packages in and out of the pair of stacked racks. The shuttles of the prior art are comprised of a running platform which can carry a package on its center and a picking mechanism which loads and unloads the package in the horizontal sideway (left and right) directions perpendicular to the direction that the platform runs.

One such prior art picking mechanism described in the Patent Disclosure Heisei 8-324721, is comprised of a three-stage elastic mechanism placed in front and back of the package carrying area. Each elastic mechanism is of well-known structure, comprised of a fixed rail affixed to the running platform, a first sliding rail which is mounted on the fixed rail so that it can slide, and a second sliding rail which is mounted on the first sliding rail so that it can slide. The first and the second sliding rails are connected by a pulley and belt, so that when the first sliding rail slides on the fixed rail, the second sliding rail slides in the same direction as the first sliding rail. Furthermore, the means of actuation of the first sliding rail is comprised of a motor mounted on the running platform, a pinion mounted on the rotating shaft of the motor, and a rack mounted on the first sliding rail that meshes with the pinion.

On the second sliding rail, there are terminal fingers that operate between the extended position, in which the fingers protrude towards the package carrying area, and the retracted position, in which the fingers are retracted from the package carrying area. By placing the terminal fingers into the extended position so that they can hold the end surfaces of the package, it is possible to load and unload a package.

There is the ever present issue of increasing the storage capacity of a three-dimensional warehouse, and a number of methods have been proposed. One such method is to place packages far back (i.e., away from the running path of the transferring shuttle) on each of the shelves of the stacked racks, for example, in two rows, back and front. To realize this method, the maximum stroke of the elastic mechanism must be doubled.

However, in order to increase the stroke of the elastic mechanism, i.e., to improve the general transferring shuttle such as described in Patent Disclosure Heisei 8-324721, the number of sliding rails must be increased to at least three. Increasing the number of wearable members such as sliding rails may lead to breakage. Also, as the device structure becomes more complex, commonization of purchased parts becomes difficult, and the economy of scale becomes less viable, leading to an increase in manufacturing cost. Furthermore, the increase in the thickness of the elastic mechanism necessitates the designing of sufficient space for the sliding rail above the layered stacked rack and increases the needed clearance between the packages, hindering the increase of the storage capacity in the end.

SUMMARY OF THE INVENTION

The present invention provides a solution for the aforementioned problems and provides a transferring shuttle which can place more packages on each shelf of the layered stacked racks.

The transferring shuttle of one embodiment transfers packages in and out of the layered stacked racks, while being deployed in a three dimensional automated warehouse with at least one pair of layered stacked racks. The transferring shuttle is comprised of the following: a platform which can run in a horizontal direction and is equipped with a package carrying area where the package can be transported; elastic mechanisms in the front and rear of the package carrying area with respect to the running direction of the platform, comprised of multiple rails so that they can be extended or contracted in a horizontal direction perpendicular to the running direction of the platform; and terminal fingers placed at the ends of the rails with the maximum excursion among the rails which can assume the extended position in which the fingers protrude towards the package carrying area and the contracted position in which the fingers recede from the package carrying area. The shuttle further includes inside fingers, which can operate between the extended and contracted positions, and which are placed on the rails closest to the package carrying area between the terminal fingers.

The package can be transferred in and out by placing the terminal fingers in the extended position so that the left and right end surfaces of the package are pushed by the fingers. In the prior art, the packages are pushed by the terminal fingers on the rail; however, in an embodiment of the present invention, having the fingers further inside pushes the package while reducing the overlap between the rails and makes it possible to transfer the package into a deeper position in the layered stacked rack. Thus, it becomes possible to contain more packages in a layered stacked rack. More specifically, two packages in a row (front and back with respect to the direction of the movement of the packages) can be placed with a three-rail elastic mechanism. Also, since there is no need to increase the number of the rails in the elastic mechanism, there is no requirement for extra clearance between the packages. Furthermore, the addition of the inner fingers allows the existing profile (of the steel shape) to be maintained, thereby preventing an increase in production cost.

In one embodiment, there may be two sets of inner fingers. By having two sets of inner fingers, three packages can be handled simultaneously, depending on the size and shape of the packages (as shown in FIG. 7C). Furthermore, the inner fingers may be positioned such that sufficient space exists for placing a package between an inner finger and the terminal finger further away from the inner finger, or between the other inner finger and the other terminal finger. By allowing the terminal finger to travel a distance exceeding the length of two packages placed next to each other in the layered stacked rack adjacent to the terminal finger, it becomes possible to place two packages in a row (front and back).

Each of the elastic mechanisms may be affixed to the running platform and may include the following: a fixed rail which extends in the horizontal direction perpendicular to the running direction; a first sliding rail mounted on the fixed rail parallel to a horizontal direction which is able to slide along the fixed rail; and a second rail mounted on the first sliding rail parallel to the horizontal direction which is able to slide along the first sliding rail, in the same direction that the first sliding rail slides. In such a case, the terminal fingers and the inner fingers may be placed on the second sliding rail.

Furthermore, the method of actuation of the first sliding rail may be comprised of an endless belt with teeth on the exterior perimeter and a rack mounted on the first sliding rail which meshes with the teeth on the exterior surface. By using the belt with external teeth, rather than pinions, it becomes possible to extend the first sliding rail beyond the fixed rail.

Furthermore, in another embodiment, one inner finger is provided. With this construction, two packages can be handled simultaneously.

DETAILED DESCRIPTION OF THE EMBODIMENTS

Figure 1:
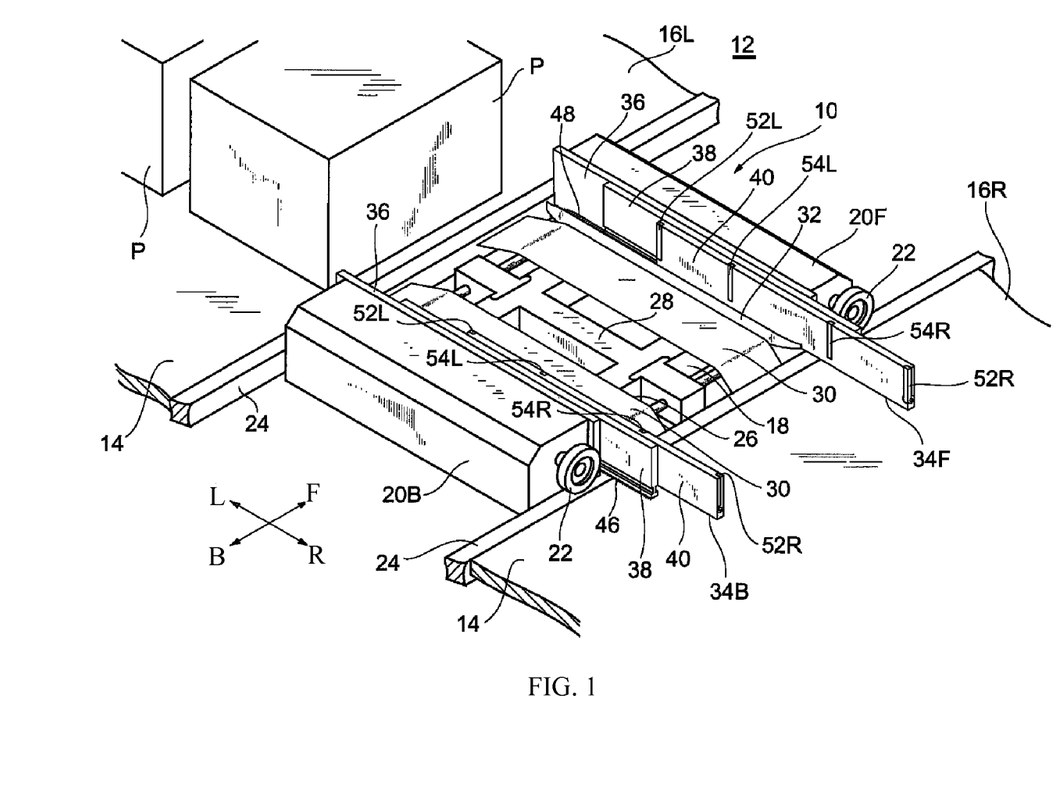
FIG. 1 is a perspective drawing partially showing a three dimensional warehouse in which an embodiment of a transferring shuttle may be used.

FIG. 1 is a perspective drawing partially showing a three dimensional warehouse 12 in which an embodiment of a transferring shuttle 10 is used. The three-dimensional automated warehouse 12 shown in the figure contains at least one pair of layered stacked racks 16L, 16R made of multiple layers of shelves 14. Transferring shuttle 10 may be implemented between the layered stacked racks 16L, 16R for every layer, or every few layers, of layered stacked racks 16L, 16R, in order to transfer packages P. In this implementation, the layered stacked racks 16L, 16R store packages P with fixed shape, such as baskets, plastic containers, etc. The depth (the distance in the left-right direction of FIG. 1 indicated by arrow L-R) of the shelf 14 in the layered stacked racks 16L, 16R is double the depth of the prior art. Because of the function of the transferring shuttle 10, it is possible to place two packages P side by side (i.e. aligned in direction L-R on the same shelf 14).

Not shown in the figure are relaying station(s) which is (are) placed at one or both ends of the layered stacked racks 16L, 16R in order to exchange the packages between the layered stacked racks 16L, 16R and an external transfer system, where the packages are exchanged with the layered stacked racks 16L, 16R via the transferring shuttle 10 and the packages may be temporarily stored. An elevator device, which exchanges the packages between the relaying station and the external transfer system, is also not shown. The relaying stations, external transfer system, and elevator devices may take on known configurations.

Transferring shuttle 10 is equipped with a running platform 18 which runs in a front-back (see arrows F-B of FIG. 1) horizontal direction between the left and right layered stacked racks 16L and 16R. The chassis sections 20F, 20B, containing the driving motor, electrical power source, control unit (not shown), etc., are located at the front and the back sides of the running platform 18. Running wheels 22 are located on each of the left and the right sides of each of the chassis sections 20F, 20B. The running wheels 22 are mounted on the guide rails 24 which extend in the horizontal direction (F-B) and are placed on each layer of the layered stacked racks 16L, 16R. Thus, the running platform 18 can move forward or backward by rotating at least one running wheel 22 using the driving motor contained in the chassis section 20F or 20B.

The part of running platform 18 between the front chassis section 20F and the back chassis section 20B is the package carrying area 26, which carries the package P. More precisely, the base frame 28 connects the lower parts of the front and back chassis sections 20F and 20B, and a pair of package carrying plates 30 are placed horizontally on the base frame 28, comprising the bottom surface of the package carrying area 26. The side guide 32 is created on the outer edge, which is the edge towards the adjacent chassis section 20F or 20B, of each package carrying plate 30, and the distance between the side guides 32 is slightly larger than the width of the package P. Thus, the package P can be moved in the transverse (left-right) direction on the package carrying plates 30 without rotating or shifting excessively. The length of the package carrying area 26, i.e. the transverse left-right dimension, is made sufficiently large to accept normally handled packages P.

A pair of elastic mechanisms 34F, 34B, which are for loading and unloading the package P, are placed at the chassis sections 20F, 20B and surround the package carrying area 26. The elastic mechanisms 34F, 34B are actuated in synchronized fashion, and are used to transfer the package between the package carrying area 26 and the shelves 14 of the layered stacked racks 16L, 16R.

Figure 2:
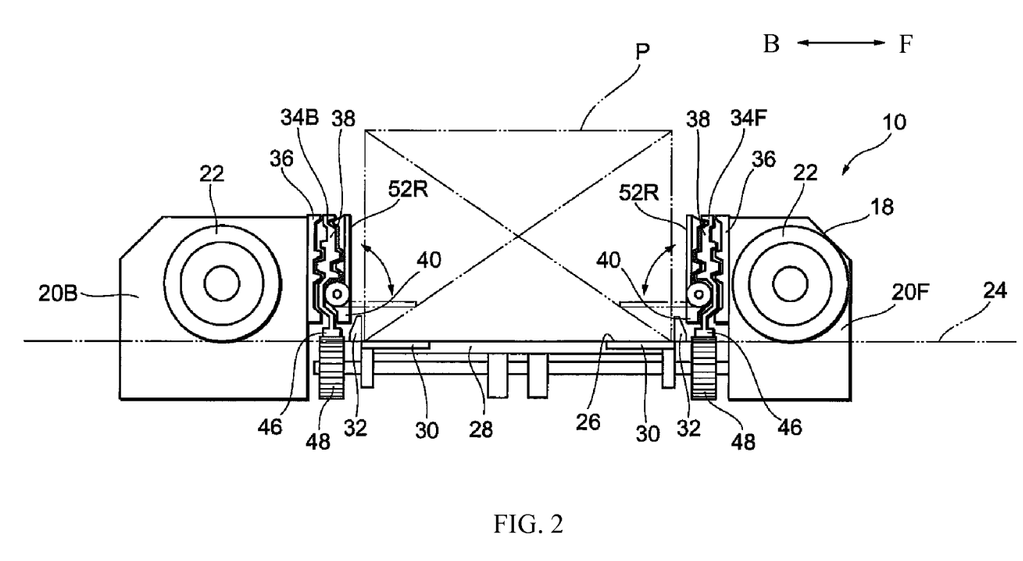
FIG. 2 is a side view drawing of the transferring shuttle of FIG. 1.
Figure 3:
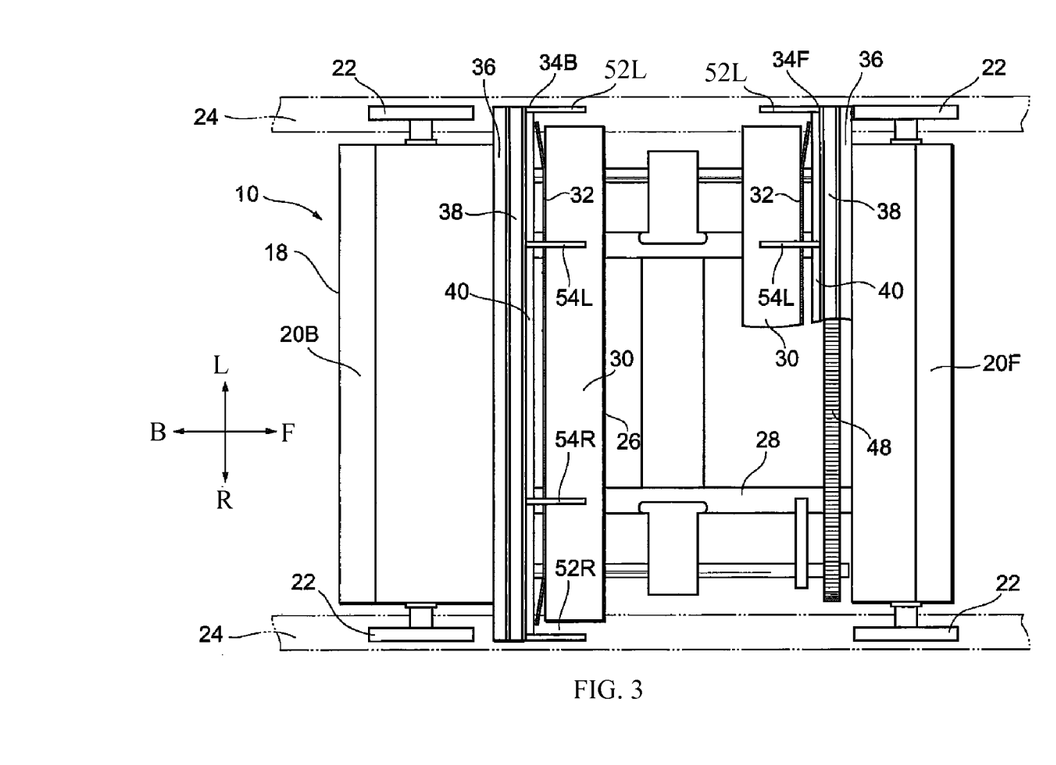
FIG. 3 is a plan view drawing of the transferring shuttle of FIG. 1, with the interior partially shown.
Figure 4A:
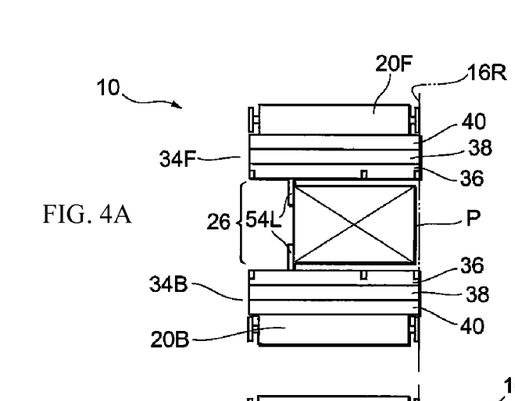
FIGS. 4A-C are schematic drawings showing the motion of the transferring shuttle of FIG. 1.

Each of the elastic mechanisms 34F, 34B is comprised of a fixed rail 36 that is affixed onto the inner surfaces, i.e. the surfaces that face the package carrying area 26, of the chassis sections 20F, 20B, and that extends in the transverse direction (L-R), i.e. the horizontal direction perpendicular to the running direction (F-B) of the running platform. A first sliding rail 38 is mounted on the fixed rail 36 so that it can slide in the same horizontal direction (L-R). A second sliding rail 40 is mounted on the first sliding rail 38 so that it can slide in the same horizontal direction, with the maximum range of motion. The rails 36, 38 and 40 have effectively the same length, which is effectively equal to the width of the running platform 18 including the running wheel 22. When the running platform 18 is in motion, the rails 36, 38 and 40 are in the contracted position as shown in FIG. 2, FIG. 3 and FIG. 4A, and the rails will not protrude from the side surface of the running platform 18. On the other hand, when the package P is exchanged with one of the layered stacked racks 16L, 16R, the rails will be in the extended position shown in FIG. 4B. The dimensions of the rails 36, 38 and 40 of the elastic mechanisms 34F and 34B are determined so that, under the maximum extension, the tip of the second sliding rail 40 reaches the point beyond the depth of two packages side by side (plus the necessary clearance).

Figure 5A:
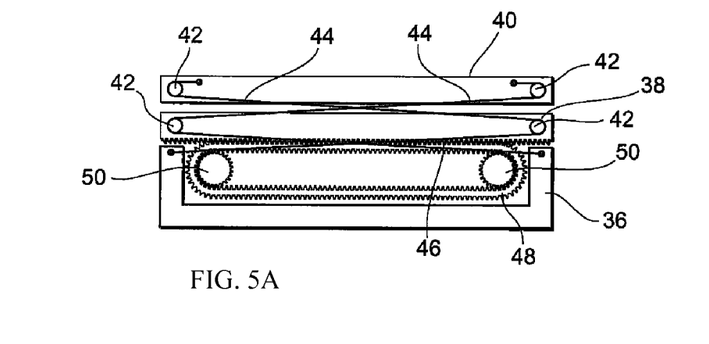
FIGS. 5A-B are schematic drawings showing the principle of the elastic mechanism used in the transferring shuttle of FIG. 1.
Figure 5B:
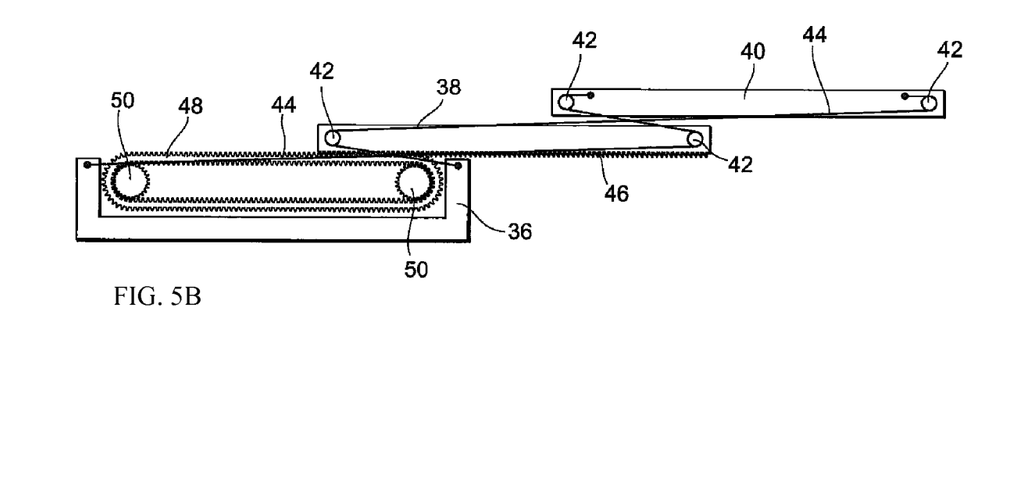

The mechanism of extending and contracting the elastic mechanism 34F and 34B is of already known kind as shown in FIG. 5, which shows the principle of the actuation, comprised of pulley 42 and belt (or wire) 44. When the first sliding rail 38 is moved left or right against the fixed rail 36, the second sliding rail 40 moves further along the first sliding rail 38 in the same direction.

The means of actuating the first sliding rail 38 is comprised of a rack 46, which is formed at the bottom edge of the first sliding rail 38 in its entire length; a timing belt 48 (endless belt with internal teeth) with exterior teeth that mesh with the rack 46; and a motor which drives the timing belt 48 (not shown). The timing belt 48 goes around the sprockets that are placed on the left and the right edges of the base frame 28 (see FIG. 5), and the upper part of the timing belt 48 (the side tension is applied to) extends almost the entire space between the left and the right ends of the running platform 18. Thus, when the elastic mechanisms 34F and 34B are in the contracted position, virtually the entire rack 46 on the first sliding rail 38 is engaged with the outer teeth of the timing belt 48. Also, as long as the outer teeth of the timing belt 48 are engaged with the rack 46, the first sliding rail 38 can be extended maximally from the fixed rail 36 and the second sliding rail 40 can also be extended by the same distance relative to the first sliding rail 38. The excursion of the sliding rails 38 and 40 can be increased greatly, compared to the prior art in which a rack and pinion mechanism is used as the means of actuating the elastic mechanism 34F and 34B.

The driving motor to drive the timing belt 48 is not shown in the figures, but it is contained in the chassis section 20B on the running platform 18 and may be of known construction.

Terminal fingers 52L and 52R, which are to contact the side surface of the package P and push and pull the package, are placed at both ends of the second sliding rail 40 (FIG. 1). Each of the terminal fingers 52L and 52R has one end anchored to the shaft of the driving motor (not shown in the figures) embedded in the second sliding rail 40, and can move between the position shown in the solid line in FIG. 2 and the position shown in the solid line in FIG. 3 (shown in a broken line in FIG. 2) by controlling the motor. In the contracted position shown in FIG. 2, the terminal fingers 52L and 52R are sufficiently retracted from the package carrying area 26 such that the fingers will not interfere with the package P on the package carrying area 26 or the packages on any of the shelves 14 of the layered stacked racks 16L and 16R. On the other hand, in the extended position shown in FIG. 3, the terminal fingers 52L and 52R protrude into the package carrying area 26 and can contact the end surfaces of the package P on the package carrying area 26.

Two inner fingers 54L and 54R are placed on the second sliding rail 40 between the terminal fingers 52L and 52R. The inner fingers 54L and 54R have the same shape and dimensions as the terminal fingers 52L and 52R, and are mounted on the second sliding rail 40 in the same fashion as the terminal fingers 52L and 52R. Each of these inner fingers 54L and 54R is placed at the same distance away from the longitudinal center of the second sliding rail 40. One of the inner fingers (the left inner finger 54L, for example) is paired with the terminal finger which is further away from the inner finger (the right terminal finger 52R, in this example) where the distance between these fingers is effectively the equivalent of the package P to be handled.

The operations of pushing the package P from transferring shuttle 10 to the layered stacked racks 16L or 16R and that of pulling the package P from the layered stacked racks 16L or 16R onto the transferring shuttle 10 are further elaborated.

First, consider the case where the package is loaded on the right hand side of the package carrying area 26 of the running platform 18 as shown in FIG. 4A. In order to place the package P into the deepest part of the shelf 14 of the layered stacked rack on the right hand side 16R, i.e. the location that is furthest from the transferring shuttle 10, the inner finger 54L is moved to assume the extended position. Thereafter, the elastic mechanisms 34F and 34B are actuated to extend the sliding rails 38 and 40 towards the right side. As a result, the inner fingers 54L contact the left side surface of the package P and push the package. At the time the second sliding rail is extended the furthest, the package P reaches the deepest part of the shelf 14 of the layered stacked rack 16R (FIG. 4B).

Figure 4B:
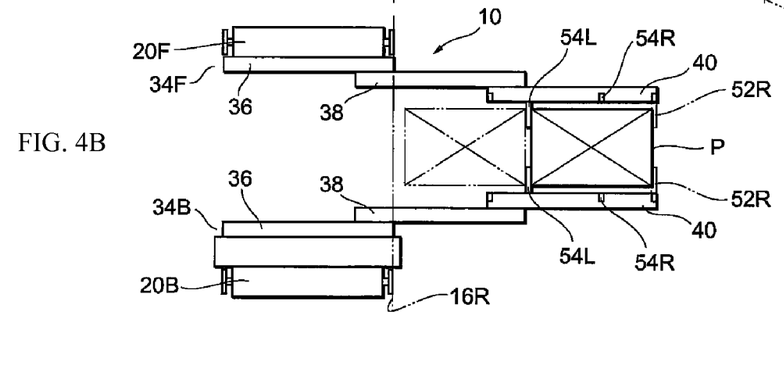

It should be easily understood that the extension distance of the sliding rails 38 and 40 should be shorter when the package P is to be placed in a shallower location in the layered stacked rack 16R, i.e. the location closer to the transferring shuttle 10, as shown in broken lines in FIG. 4B.

Figure 4C:
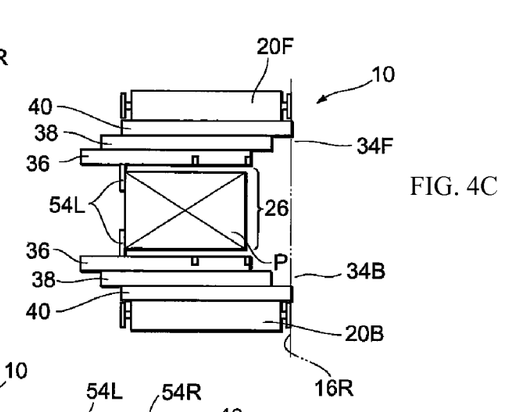

On the other hand, when the package is originally placed on the left hand side of the package carrying area 26 of the running platform 18 as shown in FIG. 4C, the sliding rails 38 and 40 of the elastic mechanisms 34F and 34B are first moved to the location further left so that the inner fingers 54L are to the left of the left hand side surface of the package P. Next, the inner fingers 54L are put into the extended position, and then the package P can be placed at the deepest location of the shelf 14 of the layered stacked rack 16R with the procedure described above.

To place the package P at the shallower position of the layered stacked rack 16R, i.e. the location closer to the transferring shuttle 10 shown with broken lines in FIG. 4B, it is not necessary for the elastic mechanisms to follow the procedure described above, but simply by using the left terminal finger 52L, the package P can be moved in a single stroke.

The sequence of motion described in paragraph [0037] above includes an extra number of moves, and thus may adversely affect the capacity. This sequence, however, can be avoided if some consideration is made during the procedure of loading the package P onto the transferring shuttle 10. Normally, the new package P is received at the relaying station (not shown in figures) where the package is temporarily stored in stand-by mode. By having the placement at the relaying station closer (with respect to the movement of the elastic mechanism), both the outer (terminal) and inner finger can reach the package, and depending on the direction of the rack where the package is to be stored, the fingers to be used can be selected. Thus, the procedure described in [0037] above can be avoided.

EXAMPLE 1

If the relaying station is on the right hand side of FIG. 4, and the storage location in the rack is on the right hand side, use the outer (terminal) finger to pull in the package.

EXAMPLE 2

If the relaying station is on the right hand side of FIG. 4, and the storage location in the rack is on the left hand side, use the inner finger to pull in the package.

It should be obvious that the cases where the relaying station is on the left side can be effectively dealt with by going through a similar (symmetric) set of motions.

If the storage location is close (to the transferring shuttle), either the outer (terminal) finger or the inner finger can be used in the loading of the package P to avoid the procedure described above in paragraph [0037].

On the other hand, when the package P is stored at the close location and is pulled out of the layered stacked rack on the right hand side 16R and onto the transferring shuttle 10, any of the two inner fingers 54L or 54R, or the outer (terminal) fingers 52R can be used for retrieving the package P. In other words, starting from the package location shown in broken lines in FIG. 4B, the elastic mechanisms 34F and 34B can be contracted and the package P can be pulled onto the transferring shuttle 10 by left inner finger 54L. Or the inner fingers 54L and 54R can be placed in the contracted position while the right terminal finger 52R is placed in the extended position, such as shown in FIG. 4B by broken lines. In such a case, the right terminal finger 52R comes into contact with the right end surface of the package P, allowing the package P to be pulled onto the transferring shuttle 10.

When shipping out to the relaying station (in this case, the package is pulled in from the storage location in the rack), by following the similar procedure as described above, the procedure described in paragraph [0037] above can be avoided.

When the package P is placed at the deepest location on the layered stacked rack 16R, the right terminal finger 52R is used in order to transfer it.

It should be obvious for the practitioner that, in order to receive and ship the package P stored in the left layered stacked rack 16L, the reverse (symmetric) of the procedures described above would complete the tasks.

Figure 6A:
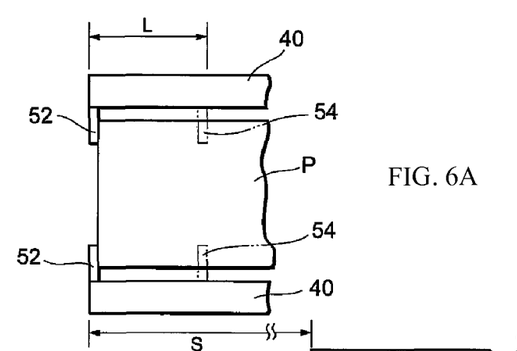
FIGS. 6A-C are schematic drawings showing inner fingers and other components of the transferring shuttle of FIG. 1.
Figure 6B:
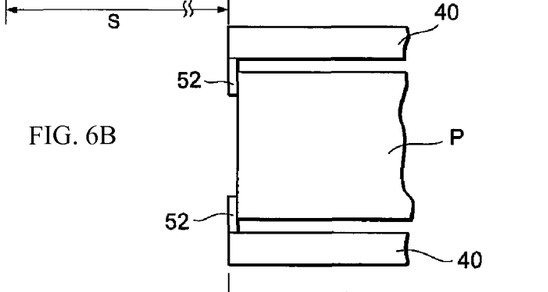
Figure 6C:
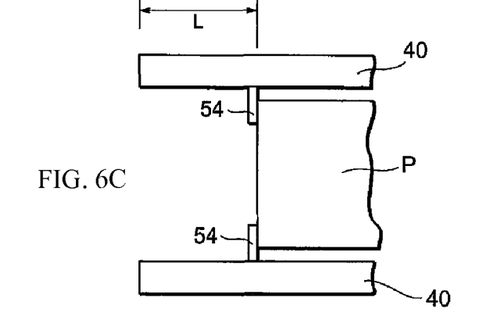

Now, using FIG. 6, a comparison is made between the construction of transferring shuttle 10 and the construction of prior art shuttles, which are equipped only with the terminal finger 52 on both ends of the second sliding rail 40.

In the construction of the prior art, the package P could only be moved through the distance S, which is the maximum excursion of the sliding rail 40, when the sliding rail 40 is moved from the state shown in FIG. 6A to the state shown in FIG. 6B. On the other hand, in the construction of transferring shuttle 10, by using the inner finger 54, as shown in FIG. 6C, the package P can be moved through the distance of the maximum excursion of the sliding rail 40 plus L, which is the distance between the terminal finger 52 and the inner finger 54. Thus, the construction of transferring shuttle 10 allows the package P to be stored in the deeper location in the layered stacked racks 16L, 16R, enabling the packages P to be stored in two rows, front and back.

Figure 7A:
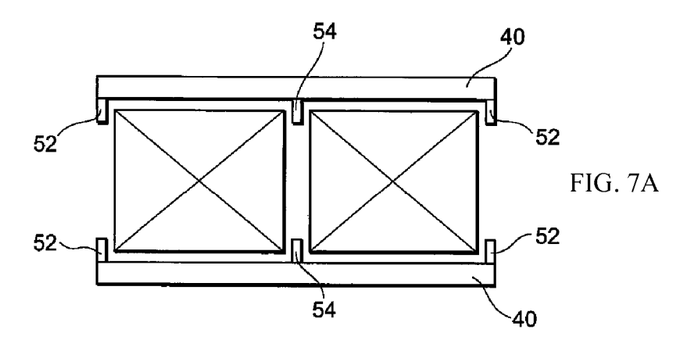
FIGS. 7A-C are schematic drawings of a number of variations of the transferring shuttle.
Figure 7B:
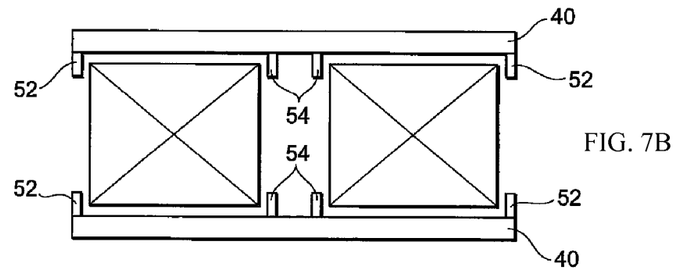
Figure 7C:
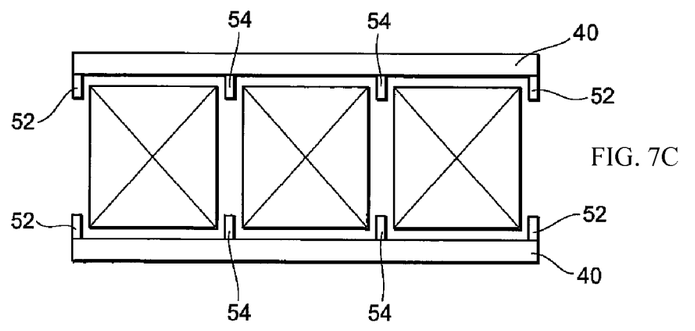

Noting this point, the construction with only one inner finger 54 shown in FIG. 7A can be considered. In this construction, two small packages P can be simultaneously transferred. Also, the two inner fingers 54 can be moved closer to the center as shown in FIG. 7B, allowing simultaneous transfer of packages P like the case shown in FIG. 7A. Furthermore, in the construction shown in FIG. 7C, it is possible to transfer three packages P simultaneously. It is not shown in the figures, but the placement of three or more fingers may be considered in order to handle a package P of indeterminate shape.

Transferring shuttle 10 allows a large range of motion of the elastic mechanisms to be secured, thereby permitting the packages to be transferred in numerous fashions due to the independently operating terminal and inner fingers. For example, in the constructions shown in FIGS. 1 through 3, when small packages are to be stored in the right stacked rack, it is possible to store three or more small packages sequentially, starting from the deepest position, by using the right inner finger 54R. It is also possible to simultaneously handle two small packages or the combination of one small and one medium package, i.e. one of the packages can be pushed with inner finger 54R while the other is pushed by the left terminal finger 52L.

The timing belt is used as the means of actuating the elastic mechanisms. The use of a hydraulic, pneumatic or linear motor for this purpose can also be considered.

The three-stage elastic mechanism is considered here for the benefit of being able to use the same profile as the prior art, but a two-stage or four-stage elastic mechanism can also be considered.

In the above description, several favorable embodiments were elaborated in detail, but the scope of this invention is not restricted to the embodiments described above. Needless to state, variations and adaptation of these embodiments are possible, without exceeding the spirit or the scope of this invention.

The invention claimed is:

1. A transferring shuttle for use in a three-dimensional automated warehouse equipped with a pair of stacked racks for travelling between and passing and receiving packages (P) to and from said pair of stacked racks, said shuttle comprising:

a mobile platform which can move horizontally in a direction of motion between said racks, said mobile platform including a package carrying area that is adapted to carry a package (P);

extendable units on opposite sides of said carrying area in the direction of motion, each comprised of a fixed rail oriented in a storage direction perpendicular to the direction of motion of said shuttle, a first sliding rail oriented in the storage direction and slidingly attached to said fixed rail and a second sliding rail oriented in the storage direction and slidingly attached to said first sliding rail so that said second rail can slide in the same direction as the first sliding rail;

a first terminal finger positioned adjacent a first end of each of said second sliding rails;

a second terminal finger positioned adjacent a second opposite end of each of said second sliding rails;

a first inner finger positioned between said first and second terminal fingers on each of said second sliding rails; and a second inner finger separated from said first inner finger and positioned between said first and second terminal fingers on each of said second sliding rails, wherein said fingers can be operated between extended positions protruding toward said package carrying area and contracted positions receding away from said package carrying area, wherein the first inner finger is closer to the first terminal finger than to the second terminal finger, wherein a distance D1 between said first inner finger and said second terminal finger is large enough so that a package (P) can be placed in between said first inner finger and said second terminal finger, wherein said second inner finger is closer to the second terminal finger than to the first terminal finger, wherein a distance D2 between said second inner finger and said first terminal finger is large enough so that a package (P) can be placed in between said second inner finger and the first terminal finger, wherein said extendable units are extendable into both said stacked racks and wherein distances D1 and D2 are each greater than half a dimension of the mobile platform in the storage direction, wherein a package (P) having a dimension in the storage direction that is greater than half the mobile platform can be stored to and retrieved from two rows on each of said pair of stacked racks with said first and second sliding rails, wherein the two rows are at different distances from said mobile platform, wherein one of said inner fingers that is positioned closest to said mobile platform can store a package (P) to a farthest one of said rows that is farthest from said mobile platform with said first and second sliding rails fully extended and wherein one of said terminal fingers that is positioned farthest from said mobile platform can retrieve a package (P) from the farthest one of said rows with said first and second sliding rails fully extended.

2. The shuttle of claim 1 further including an actuator for moving said first sliding rail on said fixed rail and said second sliding rail on said first sliding rail, said actuator including an endless belt with cog-teeth on its outer perimeter and a rack positioned on the first sliding rail which meshes with said endless belt.

3. The shuttle of claim 1 wherein said mobile platform includes a first set of wheels riding adjacent a first shelf positioned along a first side of said shuttle and a second set of wheels riding adjacent a second shelf positioned along a second, opposite side of said shuttle.

4. The shuttle of claim 1 wherein said carrying area is large enough to carry a package (P) oriented selectively at one side of said platform that is closest to one of said racks and an opposite side of said platform that is opposite from said one side and is closest to the other of said racks and wherein said inner and terminal fingers are configured to store a package (P) to said furthest row from either said one side or said opposite side of said mobile platform and retrieved from said furthest row to either the one side or the other side of said mobile platform using said terminal fingers and inner fingers.

5. A transferring shuttle for use in a three-dimensional automated warehouse and adapted to move forward and backward in a first direction oriented parallel to a longitudinal extent and between a pair of stacked racks, said shuttle comprising:
  a mobile platform adapted to move in said first direction between the racks, said mobile platform including a carrying area that is adapted to carry a package (P);
  at least two fixed rails spaced apart from each other and supported on said mobile platform in on opposite sides of said carrying area in said first direction, at least two first sliding rails adapted to move along said at least two fixed rails, respectively, and at least two second sliding rails adapted to move along said at least two first sliding rails, respectively, between extended and retracted positions in a second direction transverse to said first direction;
  a pair of first terminal fingers, each positioned adjacent a first end of one of said second sliding rails, a pair of second terminal fingers, each positioned at a second end opposite said first end of one of said second sliding rails;
  a pair of first inner fingers, each positioned between said first end and said second end of one of said second sliding rails; and
  a pair of second inner fingers spaced from said first inner fingers, each of said second inner fingers positioned between said first end and said second end of one of said second sliding rails, each of said fingers adapted to move between an extended position adapted to contact the package (P) in said carrying area and a retracted position adapted to avoid the package (P) in said carrying area;
  wherein said first inner fingers are closer to said first terminal fingers than to said second terminal fingers wherein a distance D1 between said first inner fingers and said second terminal fingers is large enough so that a package (P) can be placed in between said first inner fingers and said second terminal fingers and said second inner fingers are closer to said second terminal fingers than to said first terminal fingers on respective ones of said at least two second sliding rails wherein a distance D2 between said second inner fingers and said first terminal fingers on respective ones of said at least two second sliding rails is large enough so that a package (P) can be placed in between said second inner fingers and said first terminal fingers and wherein said first sliding rails and said second sliding rails are extendable into both said stacked racks and wherein distances D1 and D2 are each greater than half a dimension of the mobile platform in the second direction, wherein a package (P) having a dimension in the second direction that is greater than half the mobile platform can be stored in either of two rows on each of said pair of stacked racks, with said first and second sliding rails, wherein the two rows are at different distances from said mobile platform, wherein one of said inner fingers that is positioned closest to said mobile platform can store a package (P) to a farthest one of said rows that is farthest from said mobile platform with said first and second sliding rails fully extended and wherein one of said terminal fingers that is positioned farthest from said mobile platform can retrieve a package (P) from the farthest of said rows with said first and second sliding rails fully extended.

6. The shuttle of claim 5 wherein said mobile platform includes a first set of wheels adapted to ride adjacent a first shelf positioned along a first side of said shuttle and a second set of wheels adapted to ride adjacent a second shelf positioned along a second, opposite side of said shuttle.

7. The shuttle of claim 5 further including an actuator for moving said first sliding rail on said fixed rail and said second sliding rail on said first sliding rail, said actuator including an endless belt with cog-teeth on its outer perimeter and a rack positioned on the first sliding rail which meshes with said endless belt.

8. The shuttle of claim 5 wherein said carrying area is large enough to carry a package (P) oriented selectively at one side of said platform that is closest to one of said racks and an opposite side of said platform that is opposite from said one side and is closest to the other of said racks and wherein said inner and terminal fingers are configured to store a package (P) to said furthest row from either said one side or said opposite side of said mobile platform and retrieved from of said furthest row to either said one side or said other side of said mobile platform using said terminal fingers and inner fingers.

* * * * *

UNITED STATES PATENT AND TRADEMARK OFFICE
CERTIFICATE OF CORRECTION

PATENT NO. : 8,790,061 B2
APPLICATION NO. : 12/466534
DATED : July 29, 2014
INVENTOR(S) : Shin Yamashita Page 1 of 1

It is certified that error appears in the above-identified patent and that said Letters Patent is hereby corrected as shown below:

In the claims

Column 9
Line 27, Claim 4, "furthest" should be --farthest--
Line 29, Claim 4, "furthest" should be --farthest--

Column 10
Line 5, Claim 4, delete "second" after --said--
Line 52, Claim 8, "furthest" should be --farthest--
Line 53, Claim 8, delete "of" after --from--
Line 54, Claim 8, "furthest" should be --farthest--

Signed and Sealed this
Twenty-seventh Day of October, 2015

Michelle K. Lee
*Director of the United States Patent and Trademark Office*